B. CARLISLE.
LEAK DETECTOR.
APPLICATION FILED MAR. 19, 1920.

1,384,888.

Patented July 19, 1921.

Inventor:
BERT CARLISLE.
BY Hazard & Miller
Attorneys.

UNITED STATES PATENT OFFICE.

BERT CARLISLE, OF SANTA ANA, CALIFORNIA.

LEAK-DETECTOR.

1,384,888.   Specification of Letters Patent.   Patented July 19, 1921.

Application filed March 19, 1920. Serial No. 367,116.

*To all whom it may concern:*

Be it known that I, BERT CARLISLE, a citizen of the United States, residing at Santa Ana, in the county of Orange and State of California, have invented new and useful Improvements in Leak-Detectors, of which the following is a specification.

My invention is a valve leak detector for pneumatic tires.

Referring to the annexed drawing which forms a part of this specification,

Fig. 2 is a longitudinal section of my leak detector.

Fig. 3 is a side view of my leak detector.

Fig. 4 is a side view of my leak detector with its bulb shown expanded.

My valve leak detector includes a tubular stem 1 and a bulb 2 at one end of said stem, the stem being preferably made of relatively thick and stiff rubber and the bulb relatively thin and highly elastic rubber so that it may readily expand and contract. The stem 1 is formed with annular external beads 3 and 4 respectively at its ends, the mouth of the bulb 2 being stretched over the bead 4 and vulcanized to the stem as shown in Fig. 2.

Figure 1:
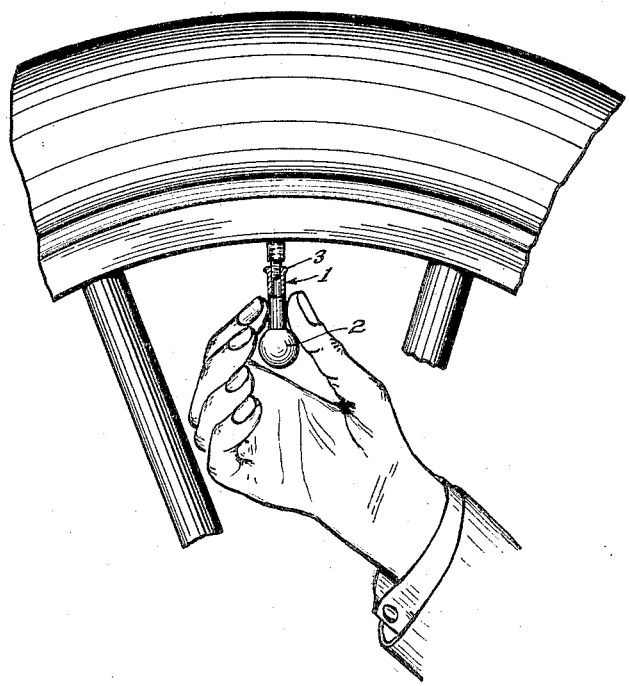
Figure 1 is a side view of a fragment of an automobile wheel and pneumatic tire and my leak detector applied to the tire valve.
Figure 1:
Figure 1:
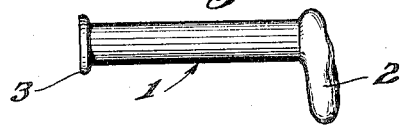
Figure 1:

To detect a leak in a pneumatic tire valve the cap of the valve is first removed and the open end of the stem 1 is slipped over the end of the valve. If there is a leak in the valve the air will pass through the stem 1 into the bulb 2 and expand the bulb as shown in Figs. 1 and 4.

Various changes may be made without departing from the spirit of my invention as claimed.

What is claimed is:

A valve leak detector including a stem of relatively thick and stiff rubber formed with an external bead at one end, and a bulb of thin and highly elastic rubber, the mouth of said bulb being stretched over said bead and vulcanized to the stem.

In testimony whereof I have signed my name to this specification.

BERT CARLISLE.